(12) United States Patent
Jadhav et al.

(10) Patent No.: US 9,117,392 B2
(45) Date of Patent: Aug. 25, 2015

(54) DIRECT INTERFACING OF AN EXTERNAL GRAPHICS CARD TO A DATA PROCESSING DEVICE AT A MOTHERBOARD-LEVEL

(71) Applicant: NVIDIA Corporation, Santa Clara, CA (US)

(72) Inventors: Mahesh Sambhaji Jadhav, Maharashtra (IN); Rupesh Deorao Chirde, Maharashtra (IN)

(73) Assignee: NVIDIA Corporation, Santa Clara, CA (US)

( * ) Notice: Subject to any disclaimer, the term of this patent is extended or adjusted under 35 U.S.C. 154(b) by 102 days.

(21) Appl. No.: 13/935,662

(22) Filed: Jul. 5, 2013

(65) Prior Publication Data
US 2015/0009221 A1    Jan. 8, 2015

(51) Int. Cl.
| | |
|---|---|
| *G06T 1/20* | (2006.01) |
| *G09G 5/00* | (2006.01) |
| *G06F 3/14* | (2006.01) |
| *G09G 5/36* | (2006.01) |
| *G06T 15/00* | (2011.01) |

(52) U.S. Cl.
CPC *G09G 5/006* (2013.01); *G06F 3/14* (2013.01); *G06T 1/20* (2013.01); *G06T 15/005* (2013.01); *G09G 5/363* (2013.01)

(58) Field of Classification Search
CPC ........ G06F 3/1438; G09G 5/363; G06T 1/20; G06T 15/005

USPC .......................................... 345/501, 502, 520
See application file for complete search history.

(56) References Cited

U.S. PATENT DOCUMENTS

| | | | |
|---|---|---|---|
| 6,337,746 B1 | 1/2002 | Coyle et al. | |
| 6,691,195 B1 | 2/2004 | Aguilar et al. | |
| 7,499,285 B2 | 3/2009 | Chen et al. | |
| 7,576,745 B1 * | 8/2009 | de Waal et al. | 345/502 |
| 7,782,325 B2 | 8/2010 | Gonzalez et al. | |
| 2005/0253828 A1 * | 11/2005 | Jeong | 345/204 |
| 2008/0318454 A1 * | 12/2008 | Wu et al. | 439/84 |
| 2011/0067038 A1 * | 3/2011 | Troccoli et al. | 719/327 |
| 2013/0120406 A1 | 5/2013 | Li et al. | |

FOREIGN PATENT DOCUMENTS

EP          0902372 A1       3/1999

\* cited by examiner

*Primary Examiner* — Joni Richer
(74) *Attorney, Agent, or Firm* — Zilka-Kotab, PC

(57) ABSTRACT

A method includes providing an Input/Output (I/O) interface at a periphery of a motherboard of a data processing device, and providing traces between a processor of the data processing device and the I/O interface across a surface of the motherboard. The traces provide conductive pathways between circuits of the processor and the I/O interface. The method also includes exposing the I/O interface through an external cosmetic surface of the data processing device in an assembled state thereof by way of a port complementary to that of a port of an external graphics card to enable direct coupling of the external graphics card to the data processing device through the exposed I/O interface by way of the complementary ports to provide boosting of processing through the data processing device.

20 Claims, 6 Drawing Sheets

US 9,117,392 B2

DIRECT INTERFACING OF AN EXTERNAL GRAPHICS CARD TO A DATA PROCESSING DEVICE AT A MOTHERBOARD-LEVEL

FIELD OF TECHNOLOGY

This disclosure relates generally to data processing devices and, more particularly, to direct interfacing of an external graphics card to a data processing device at a motherboard-level.

BACKGROUND

A data processing device (e.g., a personal computer, a laptop computer, a notebook, a netbook, an ultrabook, a mobile device such as a mobile phone) may be limited in processing capability by a processor (e.g., Central Processing Unit (CPU)) thereof. In order to boost processing capability (e.g., graphics capability), a user of the data processing device may have to make a motherboard level modification in hardware in order to accommodate an auxiliary processor (e.g., a graphics processor in a graphics card) by providing, for example, an expansion slot such as a Peripheral Component Interconnect Express (PCIe) interface and an Advanced Graphics Port (AGP). Even when the aforementioned expansion slot is provided in the motherboard, the user (or, service personnel) may have to manually disassemble the data processing device to replace the auxiliary processor when required.

SUMMARY

Disclosed are a method, a device and/or a system of direct interfacing of an external graphics card to a data processing device at a motherboard-level.

In one aspect, a method includes providing an Input/Output (I/O) interface at a periphery of a motherboard of a data processing device, and providing traces between a processor of the data processing device and the I/O interface across a surface of the motherboard. The traces provide conductive pathways between circuits of the processor and the I/O interface. The method also includes exposing the I/O interface through an external cosmetic surface of the data processing device in an assembled state thereof by way of a port complementary to that of a port of an external graphics card to enable direct coupling of the external graphics card to the data processing device through the exposed I/O interface by way of the complementary ports to provide boosting of processing through the data processing device.

In another aspect, a data processing device includes a motherboard including a processor thereon, and an I/O interface at a periphery of the motherboard. The motherboard further includes traces between the processor and the I/O interface across a surface thereof to provide conductive pathways between circuits of the processor and the I/O interface. The I/O interface is exposed through an external cosmetic surface of the data processing device in an assembled state thereof by way of a port complementary to that of a port of an external graphics card to enable direct coupling of the external graphics card to the data processing device through the exposed I/O interface by way of the complementary ports to provide boosting of processing through the data processing device.

In yet another aspect, a system includes a data processing device, and a graphics card external to the data processing device. The data processing device includes a motherboard including a processor thereon, and an I/O interface at a periphery of the motherboard. The motherboard further includes traces between the processor and the I/O interface across a surface thereof to provide conductive pathways between circuits of the processor and the I/O interface. The I/O interface is exposed through an external cosmetic surface of the data processing device in an assembled state thereof by way of a port complementary to that of a port of the external graphics card to enable direct coupling of the external graphics card to the data processing device through the exposed I/O interface by way of the complementary ports to provide boosting of processing through the data processing device.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a device and/or a system of direct interfacing of an external graphics card to a data processing device at a motherboard-level. Although the present embodiments have been described with reference to specific example embodiments, it will be evident that various modifications and changes may be made to these embodiments without departing from the broader spirit and scope of the various embodiments.

Figure 1:
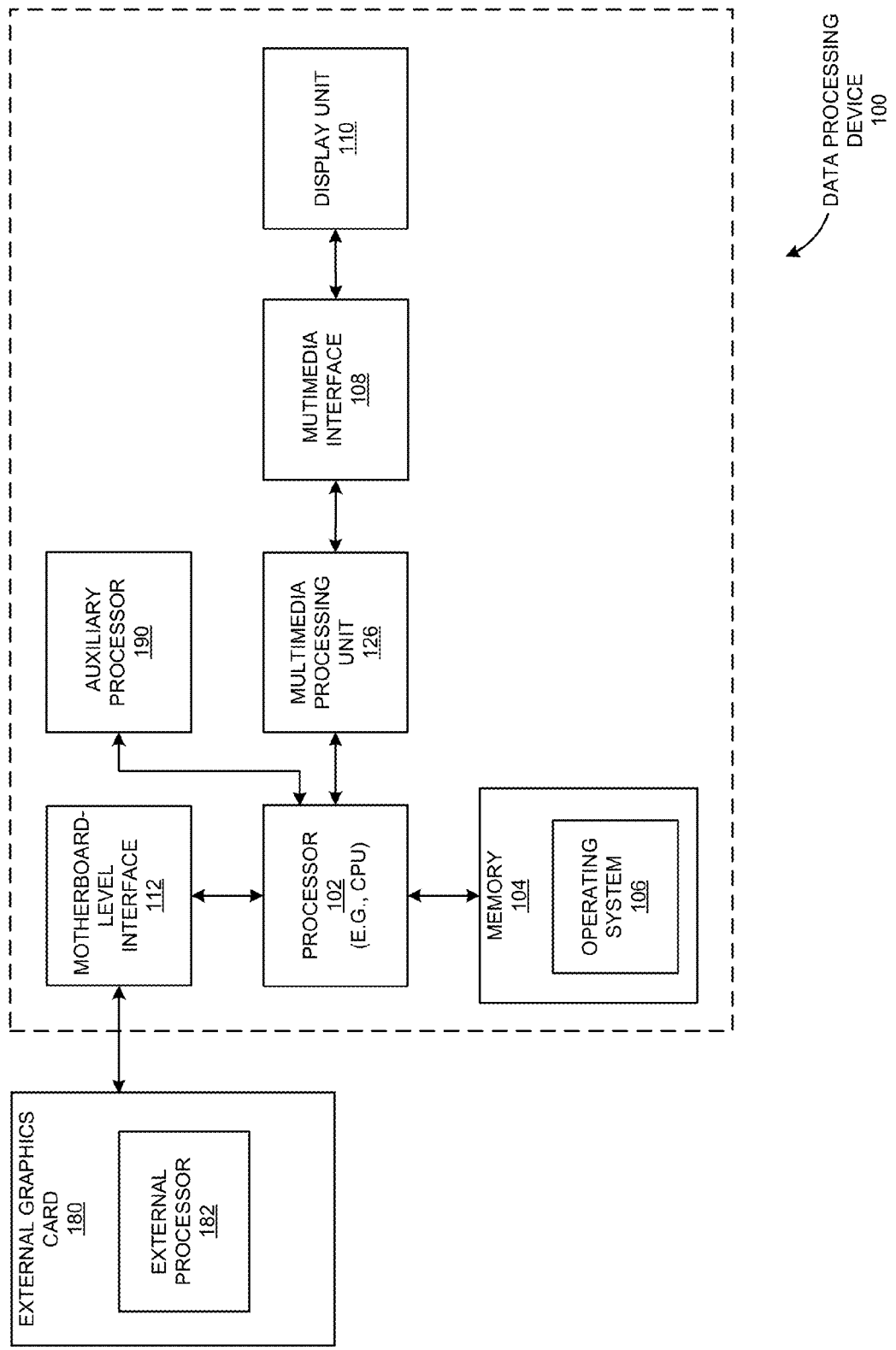
FIG. 1 is a schematic view of a data processing device, according to one or more embodiments.

FIG. 1 shows a data processing device 100, according to one or more embodiments. An example data processing device 100 may include but is not limited to a desktop computer, a laptop computer, a notebook computer, a netbook, an ultrabook, a tablet and a mobile device such as a mobile phone. In one or more embodiments, data processing device 100 may include a processor 102 (e.g., Central Processing Unit (CPU), Graphics Processing Unit (GPU)) communicatively coupled to a memory 104, processor 102 being configured to address storage locations in memory 104. In one or more embodiments, memory 104 may include a volatile memory (e.g., Random Access Memory (RAM)) and/or a non-volatile memory (e.g., Read-Only Memory (ROM), hard disk).

In one or more embodiments, output data associated with processing through processor 102 may be input to a multimedia processing unit 126 configured to perform encoding/decoding associated with the data. In one or more embodiments, the output of multimedia processing unit 126 may be rendered on a display unit 110 (e.g., Liquid Crystal Display (LCD) display, Cathode Ray Tube (CRT) monitor) through a multimedia interface 108 configured to convert data to an appropriate format required by display unit 110.

It is obvious that an operating system 106 may execute on data processing device 100. FIG. 1 shows operating system 106 as being stored in memory 104 (e.g., non-volatile memory). In one or more embodiments, a motherboard-level interface 112 coupled to processor 102 may be provided in data processing device 100 to enable coupling of an external graphics card 180 including an external processor 182 thereto. Here, external graphics card 180 may be interpreted as an Input/Output (I/O) device by processor 102. For example, motherboard-level interface 112 may be an I/O port (e.g., based on Peripheral Component Interconnect Express (PCIe) standard) facilitating a serial and/or a parallel communication link. In one or more embodiments, external graphics card 180 may serve to boost processing (e.g., graphics processing) associated with data processing device 100. In one example embodiment, external processor 182 of external graphics card 180 may be a Graphics Processing Unit (GPU). Other processors are also within the scope of the exemplary embodiments discussed herein.

Figure 2:
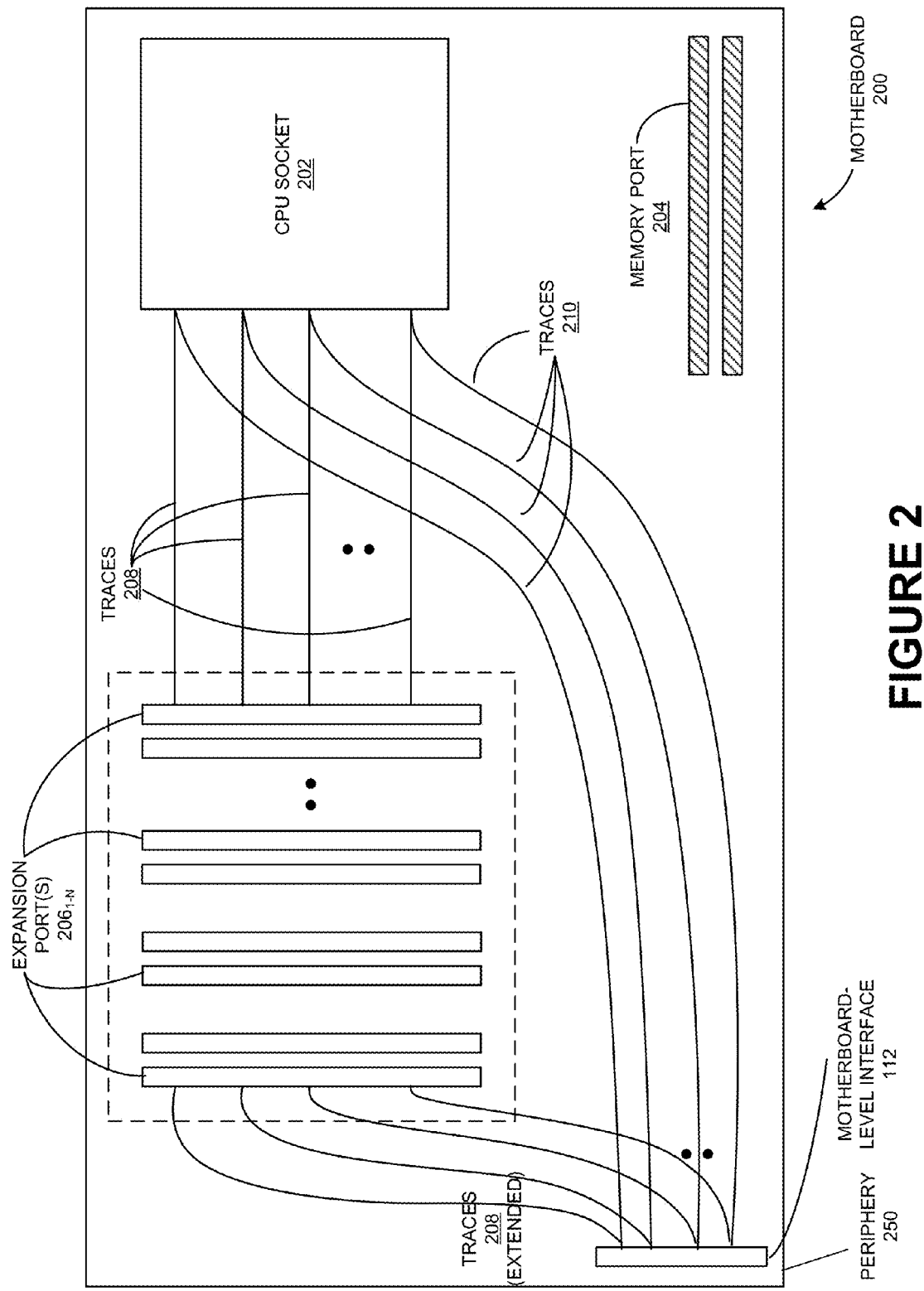
FIG. 2 is a schematic view of a motherboard of the data processing device of FIG. 1, according to one or more embodiments.

Optionally, in one or more embodiments, data processing device 100 may include an auxiliary processor 190 (e.g., a GPU that is part of another graphics card) communicatively coupled to processor 102; auxiliary processor 190 may also be configured to boost processing associated with data processing device 100. FIG. 2 shows a motherboard 200 of data processing device 100, according to one or more embodiments. In one or more embodiments, motherboard 200 may be a Printed Circuit Board (PCB) on which components critical to functioning of data processing device 100 are arranged; in other words, motherboard 200 may be the core assembly unit of data processing device 100. FIG. 2 shows motherboard 200 as including a CPU socket 202 configured to receive a CPU (example processor 102) therein.

In one or more embodiments, motherboard 200 may also include a memory port 204 configured to receive memory 104 therein. For example, a Random Access Memory (RAM) (example memory 104) may be inserted into memory port 204. Components of motherboard 200 are well known to one of ordinary skill in the art; therefore, detailed discussion associated therewith has been skipped for the sake of convenience and brevity. In one or more embodiments, motherboard 200 may include one or more expansion port(s) $206_{1-N}$, at least one of which is configured to receive auxiliary processor 190 (e.g., a graphics card including a GPU). The one or more expansion port(s) $206_{1-N}$ may, for example, be based on the Peripheral Component Interconnect Express (PCIe) standard. Other standards are within the scope of the exemplary embodiments discussed herein.

FIG. 2 also shows traces 208 between CPU socket 202 and the one or more expansion port(s) $206_{1-N}$ across a surface of motherboard 200; the aforementioned traces 208 may provide conductive pathway(s) between circuit(s) associated with processor 102 and the one or more expansion port(s) $206_{1-N}$. It should be noted that traces 208 are shown to merely illustrate the concepts associated with the exemplary embodiments; in other words, traces 208 of FIG. 2 are merely schematics. Further, other traces associated with components irrelevant to the concepts discussed herein have been omitted for the sake of clarity and brevity.

In one or more embodiments, traces 208 between CPU socket 202 and the one or more expansion port(s) $206_{1-N}$ may be extended across the surface of motherboard 200 to motherboard-level interface 112. In one or more embodiments, motherboard-level interface 112 may be provided along a periphery 250 of motherboard 200. Alternately, in one or more embodiments, a new set of traces 210 may be provided on motherboard 200 to provide conductive pathways between circuit(s) of processor 102 and motherboard-level interface 112. It should be noted that the one or more expansion port(s) $206_{1-N}$ may be optional; an example data processing device 100 may solely include motherboard-level interface 112 to enable coupling of external graphics card 180 thereto. Alternately, both the one or more expansion port(s) $206_{1-N}$ and motherboard-level interface 112 may be provided in the example data processing device 100.

Figure 3:
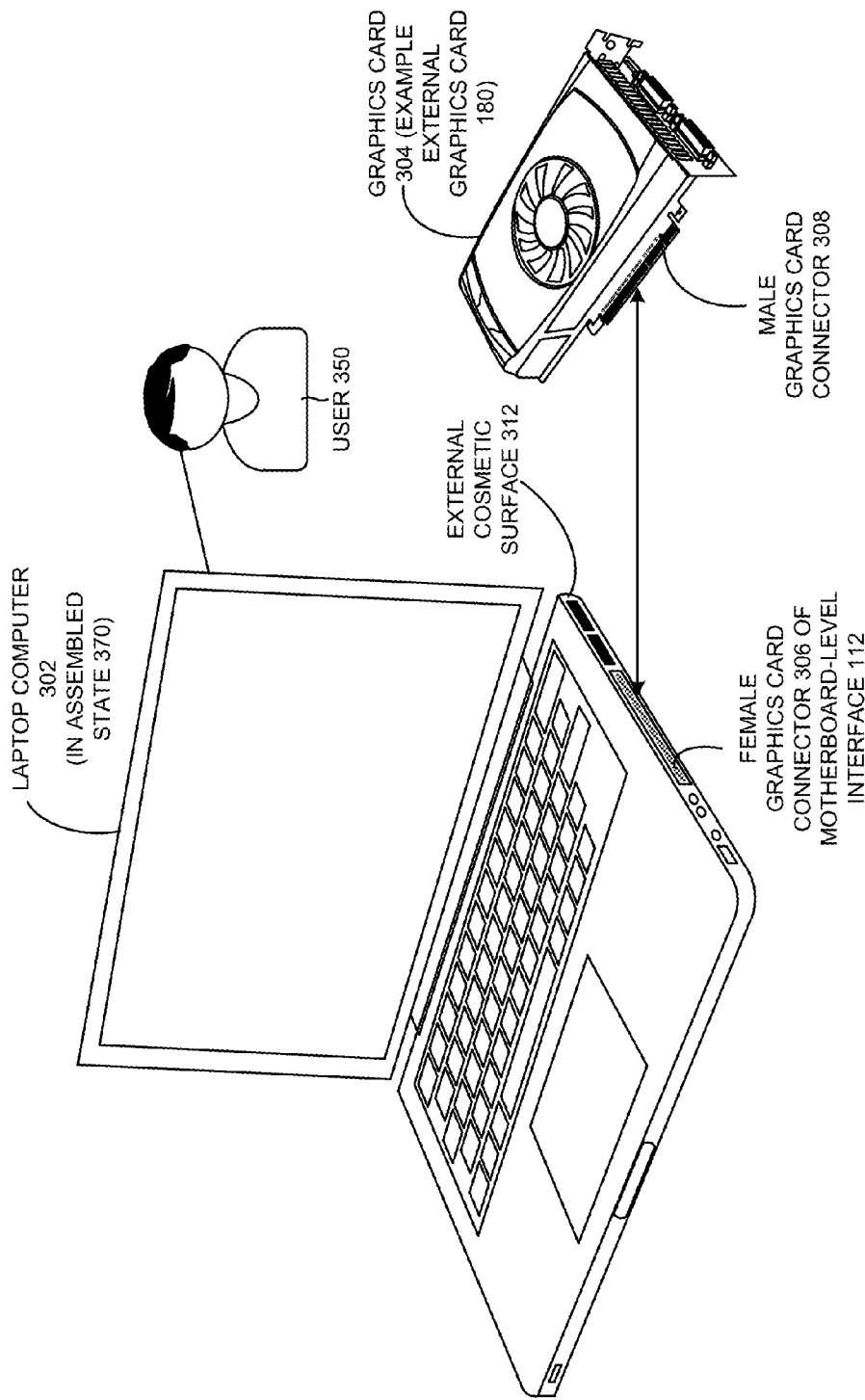
FIG. 3 is a schematic and perspective view of a motherboard-level Input/Output (I/O) interface integrally provided with an example data processing device.

Thus, exemplary embodiments provide for a means to extend the traces (e.g., through traces 208, traces 210) from processor 102 across the surface of motherboard 200 to motherboard-level interface 112; said motherboard-level interface 112 may be appropriately located such that motherboard-level interface 112 is viewable to a user of data processing device 100 on an external cosmetic surface thereof in an assembled state of data processing device 100. FIG. 3 shows motherboard-level interface 112, integrally provided with a laptop computer 302 (example data processing device 100) and viewable by a user 350 on an external cosmetic surface 312 thereof. Laptop 302 is shown in an assembled state 370 thereof. A graphics card 304 (example external graphics card 180) external to data processing device 100 and including external processor 182 may be configured to be coupled to motherboard-level interface 112 through a complementary interface thereof; FIG. 3 shows motherboard-level interface 112 as being a female graphics card connector 306 configured to mate with a corresponding male graphics card connector 308 on graphics card 304 to provide for direct coupling therebetween, without a requirement of an additional adapter therefor.

Figure 4:
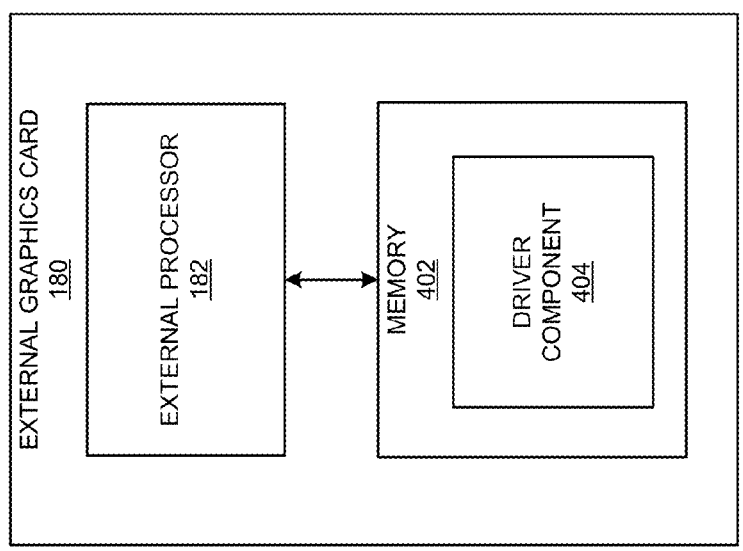
FIG. 4 is a schematic view of an external graphics card, according to one or more embodiments.

FIG. 4 shows a schematic of external graphics card 180, according to one or more embodiments. In one or more embodiments, external graphics card 180 may include external processor 182 communicatively coupled to a memory 402, with memory 402 including a driver component 404 (e.g., a set of instructions). It is obvious that memory 402 may be external to external graphics card 180 in an alternate embodiment. In one or more embodiments, driver component 404 may be packaged with appropriate libraries to enable compatibility with operating system 106 of data processing device 100. In one or more embodiments, when external graphics card 180 is coupled to motherboard-level interface 112 of data processing device 100, data processing device 100 may communicate with external graphics card 180 to read device information (e.g., through operating system 106 in conjunction with processor 102) thereof.

In one or more embodiments, following the reading of the device information, external graphics card 180 may be assigned a unique identifier (e.g., through operating system 106 in conjunction with processor 102). Then, in one or more embodiments, driver component 404 may be loaded into data processing device 100, following which driver component 404 (and associated library files) is installed in data processing device 100. In an example embodiment, a user (e.g., user 350) of data processing device 100 may be prompted through operating system 106 to install driver component 404.

In one or more embodiments, once driver component 404 is installed in data processing device 100, external graphics card 180 may merely need to be plugged in for usual use thereof during subsequent times as file(s) associated with driver component 404 are saved in data processing device 100 as system file(s) and detection of external graphics card 180 merely is based on the unique identifier assigned (and stored in data processing device 100). It is obvious that instructions associated with driver component 404 (and associated library files) may be embodied in a non-transitory medium (e.g., Compact Disc (CD), Digital Video Disc (DVD)). The aforementioned non-transitory medium may be readable through data processing device 100 and instructions associated with driver component 404 (and associated library files) executable therethrough. It is to be noted that a hard drive is also an example of a non-transitory medium. For example, driver component 404 (and associated library files) may be available as a download from the Internet. After being downloaded to a hard drive of data processing device 100, driver component 404 may then be installed therein.

Further, variations such as transferring driver component 404 wirelessly (e.g., through Wi-Fi®, Bluetooth®) or through wired means from an external device to data processing device 100 are within the scope of the exemplary embodiments discussed herein. It is also obvious that data processing device 100 may be provided with a number of motherboard-level interfaces; here, appropriate routing/traces may be provided across the surface of motherboard 200.

Figure 5:
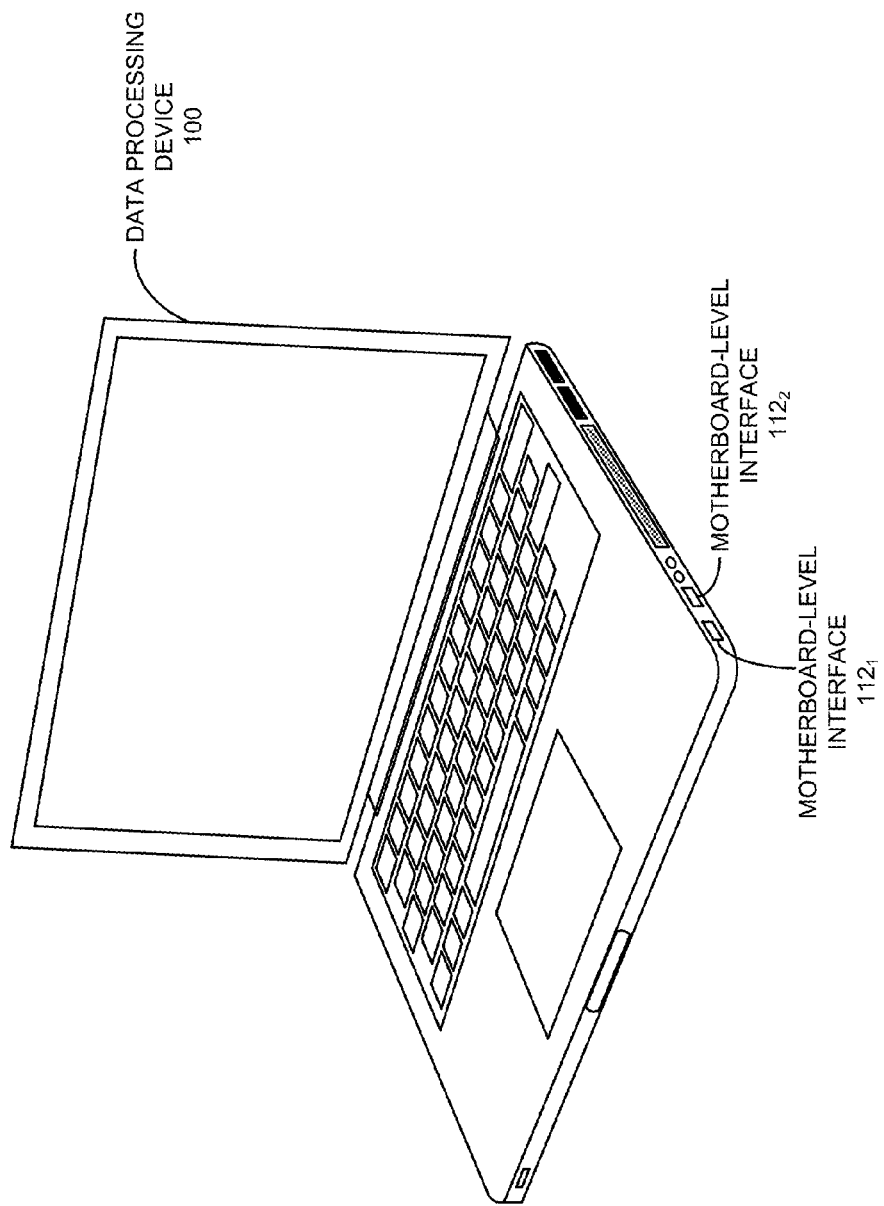
FIG. 5 is a schematic view of two motherboard-level I/O interfaces on the data processing device of FIG. 1.

FIG. 5 shows two motherboard-level interfaces ($112_1$, $112_2$) on data processing device 100 for example purposes; one motherboard-level interface may enable data transfer and the other may be configured to enable external graphics card 180 receive power supply from data processing device 100. In another example embodiment, one motherboard-level interface may be employed to enable data transfer from external graphics card 180 to data processing device 100 (e.g., processor 102) of FIG. 1, and the other motherboard-level interface may be used to enable data transfer from data processing device 100 (e.g., processor 102) to external graphics card 180.

Thus, exemplary embodiments discussed herein provide a means to utilize the processing power of external graphics card 180 through motherboard-level interface 112. As motherboard-level interface 112 may be utilized in conjunction with the one or more expansion port(s) $206_{1-N}$, data processing device 100 may be provided with a facility to leverage a new graphics card (e.g., external graphics card 180); motherboard-level interface 112 may also be thought of as enabling upgrading of capabilities provided through auxiliary processor 190. In one or more embodiments, the user of data processing device 100 may be able to leverage external graphics card 180 through motherboard-level interface 112 to play games, view High-Definition (HD) video files and/or perform high-end graphics processing.

Specifically, when data processing device 100 has low graphics-processing capabilities associated therewith, the user may be able to boost capabilities thereof without performing tedious internal hardware changes. In one or more embodiments, external graphics card 180 may derive power from data processing device 100 through motherboard-level interface 112. Alternately, external graphics card 180 may derive power from a battery (e.g., rechargeable battery) provided therein. External graphics card 180 may also be provided with a capability to derive power from an external power supply.

In one or more embodiments, when auxiliary processor 190 is present in data processing device 100, external graphics card 180 may work in conjunction therewith to provide enhanced performance. Alternately, in one or more embodiments, when auxiliary processor 190 is not present, external graphics card 180 may take over the responsibilities of enhanced processing. In one or more embodiments, as external graphics card 180 is an external device, the responsibility associated with cooling of external processor 182 rests with mechanism(s) provided in the external device.

Figure 6:
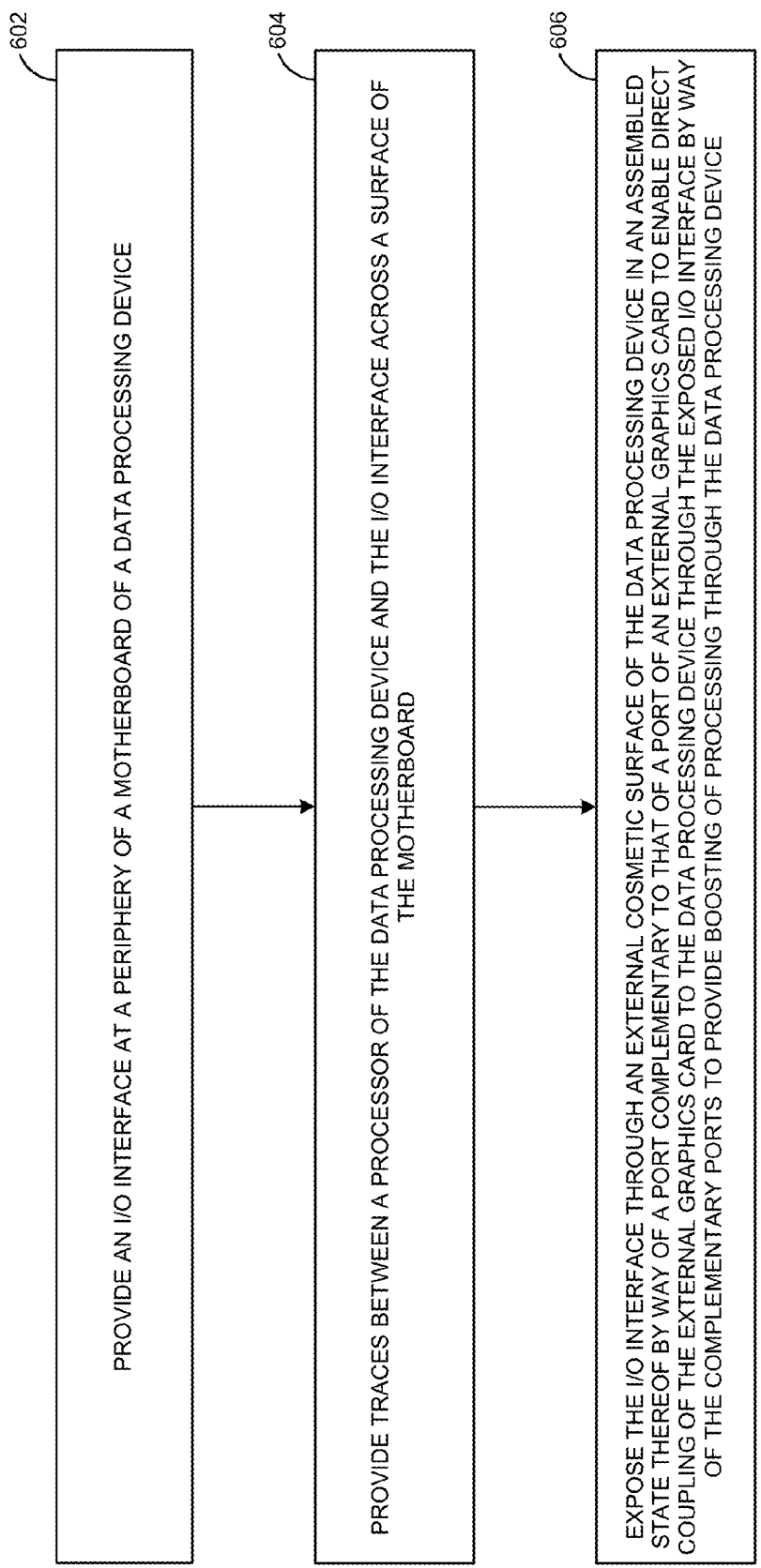
FIG. 6 is a process flow diagram detailing the operations involved in direct interfacing of the external graphics card of FIG. 4 to the data processing device of FIG. 1 at a motherboard-level, according to one or more embodiments.

FIG. 6 shows a process flow diagram detailing the operations involved in direct interfacing of external graphics card 180 to data processing device 100 at a motherboard-level, according to one or more embodiments. In one or more embodiments, operation 602 may involve providing an I/O interface (e.g., motherboard-level interface 112) at periphery 250 of motherboard 200 of data processing device 100. In one or more embodiments, operation 604 may involve providing traces (e.g., traces 208, traces 210) between processor 102 of data processing device 100 and the I/O interface across a surface of motherboard 200. In one or more embodiments, the traces may provide conductive pathways between circuits of processor 102 and the I/O interface.

In one or more embodiments, operation 606 may then involve exposing the I/O interface through external cosmetic surface 312 of data processing device 100 in assembled state 370 thereof by way of a port (e.g., female graphics card connector 306) complementary to that of a port (e.g., male graphics card connector 308) of external graphics card 180 to enable direct coupling of external graphics card 180 to data processing device 100 through the exposed I/O interface by way of the complementary ports to provide boosting of processing through data processing device 100.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a non-transitory machine-readable medium). For example, the various electrical structure and methods may be embodied using transistors, logic gates, and electrical circuits (e.g., Application Specific Integrated Circuitry (ASIC) and/or Digital Signal Processor (DSP) circuitry).

In addition, it will be appreciated that the various operations, processes, and methods disclosed herein may be embodied in a non-transitory machine-readable medium and/or a machine accessible medium compatible with a data processing system (e.g., a system including data processing device 100), and may be performed in any order (e.g., including using means for achieving the various operations). Accordingly, the specification and drawings are to be regarded in an illustrative rather than a restrictive sense.

What is claimed is:
1. A method comprising:
providing a plurality of Input/Output (I/O) interfaces at a periphery of a motherboard of a data processing device;
providing traces between a processor of the data processing device and the plurality of I/O interfaces across a surface of the motherboard, the traces providing conductive pathways between circuits of the processor and the plurality of I/O interfaces;
exposing a first I/O interface of the plurality of I/O interfaces using a first port protruding through an external cosmetic surface of the data processing device when the data processing device is assembled, where the motherboard is located inside of the external cosmetic surface of the data processing device, and where the first port receives a connector of an external graphics card located outside of the external cosmetic surface area of the data processing device to enable direct data transfer between the external graphics card and the data processing device through the exposed first I/O interface by way of the first port to enhance a processing capability of the data processing device; and exposing a second I/O interface of the plurality of I/O interfaces using a second port protruding through the external cosmetic surface of the data processing device to power the external graphics card by the data processing device.

2. The method of claim 1, wherein when the motherboard comprises an expansion port configured to receive an auxiliary processor, providing the traces further comprises extending traces across the surface of the motherboard between the processor and the expansion ports to the plurality of I/O interfaces.

3. The method of claim 2, further comprising providing additional traces across the surface of the motherboard to provide direct conductive pathways between the processor and the plurality of I/O interfaces, in addition to the extension of the traces between the processor and the expansion port to the plurality of I/O interfaces.

4. The method of claim 1, further comprising:
providing a driver component of the external graphics card in at least one of a memory of the data processing device and a memory associated with the external graphics card; and
installing the driver component in the data processing device to render the data processing device compatible with the external graphics card.

5. The method of claim 4, wherein when the driver component is resident in the memory associated with the external graphics card and when the external graphics card is coupled to the data processing device, the method further comprises at least one of:
reading, through an operating system executing on the data processing device in conjunction with the processor thereof, device information of the external graphics card;
assigning a unique identifier to the external graphics card through the operating system in conjunction with the processor of the data processing device following the reading of the device information;
loading the driver component from the memory associated with the external graphics card into the memory of the data processing device following the assignment of the unique identifier; and
installing the driver component from the memory of the data processing device to enable identification of the external graphics card during a subsequent coupling thereof to the data processing device through the plurality of I/O interfaces.

6. The method of claim 1, further comprising providing a Peripheral Component Interconnect Express (PCIe) based interface as one of the plurality of I/O interfaces.

7. The method of claim 1, wherein the method further comprises
utilizing the first I/O interface to enable data transfer from the external graphics card to the data processing device and the second I/O interface to enable data transfer from the data processing device to the external graphics card.

8. A data processing device comprising:
a motherboard including a plurality of Input/Output (I/O) interfaces at the periphery of the motherboard, where traces are provided between a processor of the data processing device and the plurality of I/O interfaces across a surface of the motherboard, the traces providing conductive pathways between circuits of the processor and the plurality of I/O interfaces;
wherein a first I/O interface of the plurality of I/O interfaces is exposed using a first port protruding through an external cosmetic surface of the data processing device when the data processing device is assembled, where the motherboard is located inside of the external cosmetic surface of the data processing device, and where the first port receives a connector of an external graphics card located outside of the external cosmetic surface area of the data processing device to enable direct data transfer between the external graphics card and the data processing device through the exposed first I/O interface by way of the first port to enhance a processing capability of the data processing device; and
wherein a second I/O interface of the plurality of I/O interfaces is exposed using a second port protruding through the external cosmetic surface of the data processing device to power the external graphics card by the data processing device.

9. The data processing device of claim 8, wherein when the motherboard further comprises an expansion port configured to receive an auxiliary processor, traces between the processor and the expansion port are extended across the surface of the motherboard to the plurality of I/O interfaces.

10. The data processing device of claim 9, further comprising additional traces across the surface of the motherboard to provide direct conductive pathways between the processor and the plurality of I/O interfaces, in addition to the traces between the processor and the expansion port extended to the plurality of I/O interfaces.

11. The data processing device of claim 8, further comprising a driver component of the external graphics card installed thereon to render the data processing device compatible with the external graphics card.

12. The data processing device of claim 8, wherein the plurality of I/O interfaces include a PCIe based interface.

13. The data processing device of claim 8, wherein the first I/O interface is utilized to enable data transfer from the external graphics card to the data processing device and the second I/O interface is utilized to enable data transfer from the data processing device to the external graphics card.

14. A system comprising:
a data processing device; and
a motherboard including a plurality of Input/Output (I/O) interfaces at the periphery of the motherboard, where traces are provided between a processor of the data processing device and the plurality of I/O interfaces across a surface of the motherboard, the traces providing conductive pathways between circuits of the processor and the plurality of I/O interfaces;
wherein a first I/O interface of the plurality of I/O interfaces is exposed using a first port protruding through an external cosmetic surface of the data processing device when the data processing device is assembled, where the motherboard is located inside of the external cosmetic surface of the data processing device, and where the first port receives a connector of an external graphics card located outside of the external cosmetic surface area of the data processing device to enable direct data transfer between the external graphics card and the data processing device through the exposed first I/O interface by way of the first port to enhance a processing capability of the data processing device; and wherein a second I/O interface of the plurality of I/O interfaces is exposed using a second port protruding through the external cosmetic surface of the data processing device to power the external graphics card by the data processing device.

15. The system of claim 14, wherein when the motherboard of the data processing device further comprises an expansion port configured to receive an auxiliary processor, traces between the processor and the expansion port are extended across the surface of the motherboard to the plurality of I/O interfaces.

16. The system of claim 15, wherein the motherboard of the data processing device further comprises additional traces across the surface thereof to provide direct conductive pathways between the processor and the plurality of I/O interfaces, in addition to the traces between the processor and the expansion port extended to the plurality of I/O interfaces.

17. The system of claim 14, further comprising: a driver component of the external graphics card provided in at least one of a memory of the data processing device and a memory associated with the external graphics card, wherein the driver component is configured to be installed in the data processing device to render the data processing device compatible with the external graphics card.

18. The system of claim 17, wherein when the driver component is resident in the memory associated with the external graphics card and when the external graphics card is coupled to the data processing device, at least one of:

device information of the external graphics card is configured to be read through an operating system executing on the data processing device, a unique identifier is configured to be assigned to the external graphics card through the operating system in conjunction with the processor of the data processing device following the reading of the device information, the driver component is configured to be loaded from the memory associated with the external graphics card into the memory of the data processing device following the assignment of the unique identifier, and the driver component is configured to be installed from the memory of the data processing device to enable identification of the external graphics card during a subsequent coupling thereof to the data processing device through the I/O interface.

19. The system of claim 14, wherein one of the plurality of I/O interfaces is a PCIe based interface.

20. The system of claim 14, wherein the first I/O interface is utilized to enable data transfer from the external graphics card to the data processing device and the second I/O interface is utilized to enable data transfer from the data processing device to the external graphics card.

* * * * *